US010435300B2

(12) United States Patent
Hou et al.

(10) Patent No.: US 10,435,300 B2
(45) Date of Patent: Oct. 8, 2019

(54) RAW MATERIAL OF COMPOSITE PELLETS USED IN KILN PHOSPHORIC ACID PROCESS, AND FORMING METHOD THEREFOR

(71) Applicant: SICHUAN KO CHANG TECHNOLOGY CO., LTD, Chengdu (CN)

(72) Inventors: Yonghe Hou, Chengdu (CN); Jiabin Wang, Chengdu (CN); Pengsheng Wang, Chengdu (CN)

(73) Assignee: SICHUAN KO CHANG TECHNOLOGY CO., LTD., Sichuan (CN)

( * ) Notice: Subject to any disclaimer, the term of this patent is extended or adjusted under 35 U.S.C. 154(b) by 236 days.

(21) Appl. No.: 14/958,903

(22) Filed: Dec. 3, 2015

(65) Prior Publication Data

US 2016/0152473 A1 Jun. 2, 2016

Related U.S. Application Data

(63) Continuation-in-part of application No. PCT/CN2013/081150, filed on Aug. 9, 2013.

(30) Foreign Application Priority Data

Jun. 4, 2013 (CN) .......................... 2013 1 0218598

(51) Int. Cl.
*C01B 25/12* (2006.01)
*C01B 25/26* (2006.01)
(Continued)

(52) U.S. Cl.
CPC .............. *C01B 25/185* (2013.01); *B05D 1/00* (2013.01); *B05D 3/002* (2013.01); *B05D 3/12* (2013.01);
(Continued)

(58) Field of Classification Search
CPC ................................. C01B 25/01; C01B 25/12
(Continued)

(56) References Cited

U.S. PATENT DOCUMENTS 3,341,289 A † 9/1967 Hendrickson
3,398,186 A † 8/1968 Schwartz
(Continued)

FOREIGN PATENT DOCUMENTS

CN 1054953 A 10/1991
CN 90105433.X C 10/1991
(Continued)

OTHER PUBLICATIONS

Translation of CN 1096273 A (1994).*
(Continued)

*Primary Examiner* — Hoa (Holly) Le
(74) *Attorney, Agent, or Firm* — Syncoda LLC; Feng Ma; Junjie Feng

(57) ABSTRACT

Disclosed is a composite pellet used as a raw material in a kiln process for the production of phosphoric acid, which is of a core-shell structure with an inner ball encapsulated with a shell, the inner ball mainly consists of a inner ball material and a binding agent, and the shell mainly consists of a cladding material and a binding agent; the inner ball material mainly consists of a carbonaceous reductant powder, and phosphate ore powder and silica powder, the inner ball is combined with the shell through the binding agent to form the core-shell shaped structure. The preparation of the composite pellets comprises the steps of preparing the inner ball, preparing the cladding material, forming, drying and solidifying composite green pellets etc. The composite pellets prepared by the present invention have a smaller range of formulation fluctuation, more stable quality, higher strength and better performance.

13 Claims, 4 Drawing Sheets

(51) Int. Cl.
*C01B 25/32* (2006.01)
*C01B 25/18* (2006.01)
*B05D 1/00* (2006.01)
*B05D 3/00* (2006.01)
*B05D 3/12* (2006.01)

(52) U.S. Cl.
CPC .......... *C01B 25/18* (2013.01); *B05D 2203/00* (2013.01); *B05D 2350/10* (2013.01)

(58) Field of Classification Search
USPC ........................................ 423/299, 304, 305
See application file for complete search history.

(56) References Cited

U.S. PATENT DOCUMENTS

| | | | |
|---|---|---|---|
| 4,389,384 | A | 6/1983 | Hard |
| 4,615,712 | A † | 10/1986 | Wen |
| 7,378,070 | B2 † | 5/2008 | Megy |
| 7,910,080 | B2 | 3/2011 | Megy |
| 10,005,669 | B2 * | 6/2018 | Hou .......................... F27B 7/20 |

FOREIGN PATENT DOCUMENTS

| | | | |
|---|---|---|---|
| CN | 1096273 | A † | 12/1994 |
| CN | 93111447.0 | A | 12/1994 |
| CN | 1569719 | A | 1/2005 |
| CN | 1986393 | A | 6/2007 |
| CN | 101143717 | A | 3/2008 |
| CN | 101428775 | A | 5/2009 |
| CN | 101519282 | A | 9/2009 |
| CN | 101531351 | A | 9/2009 |
| CN | 101973536 | A | 2/2011 |
| CN | 102701164 | A | 10/2012 |
| CN | 103663396 | A | 3/2014 |

OTHER PUBLICATIONS

International Search Report in international application No. PCT/CN2013/081150, dated Feb. 20, 2014.
English Translation of the Written Opinion of the International Search Authority in international application No. PCT/CN2013/081150, dated Feb. 20, 2014.
Zhang, Guogan etc., The production of humic acid sodium, Industrial Chemistry, mailed on Oct. 31, 1998.
Fan, Guangquan, Pelletizing industry knowledge skills, Technical Questions and Answers on Pellet Production, mailed on May 31, 2010.
Zeng, Fanduan; The Basic Principles of Kiln Process Phosphoric Acid and Its Meaning for Industrialization Production, mailed on Dec. 31, 1999.
Homogenization, Chemical Environmental Protection Design Manual, mailed on Jun. 30, 1998.
Jacob Mu, et.al, Reduction of Phosphate Ores by Carbon: Part I. Process Variables for Design of Rotary Kiln System, in Metallurgical Transactions B, vol. 17B, pp. 861-868 (Dec. 1986).†
Leder et al., New Process for Technical-Grade Phosphoric Acid, in Ind. Eng. and Chem. Process Design and Development 24(3), pp. 688-697 (American Chemical Society 1985).†
FLSMIDTH, CF Raw Meal Silo, pp. 1-8 (2011).†
P.A. Sychkov, et al, Not Fuel Using of Brown Coal, pp. 1-10 (Oil and Gas Business 2009).†
Yin Xianguo, Discussion of the Current Trial Production of CDK Kiln-Method Phosphoric Acid Technology in China, Phosphate and Compound Fertilizer, vol. 22(1), pp. 33-35 (Translation pp. 1-8) (Jan. 2007).†
Metso, Grate-Kiln Iron Ore Pelletizing System, pp. 1-8 (2010).†
Karl Oscar Albrecht, Development and Testing of a combined catalyst/sorbrnt core-in-shell material for the production of high concentration hydrogen, p. 152 (Iowa State University 2008).†
Pratiksha Pandey, et al., Optimization of Disc Parameters Producing More Suitable Size Range of Green Pellets, International Journal of Metallurgical Engineering 2012, 1(4): 48-59.†

\* cited by examiner
† cited by third party

RAW MATERIAL OF COMPOSITE PELLETS USED IN KILN PHOSPHORIC ACID PROCESS, AND FORMING METHOD THEREFOR

CROSS-REFERENCE TO RELATED APPLICATION

The application is a continuation in part of PCT/CN2013/081150 (filed on Aug. 9, 2013), which claims priority of CN Patent Application Serial No. 201310218598.7 (filed on Jun. 4, 2013) the contents of which are incorporated herein by reference in their entirety.

FIELD OF THE INVENTION

The present invention relates to a raw material used in kiln phosphoric acid (KPA) process and method thereof, and particularly to a raw material of composite pellets used in kiln phosphoric acid process and forming method thereof.

BACKGROUND OF THE INVENTION

At present, there are chiefly two processes for producing phosphoric acid in industry. (1) producing phosphoric acid with a wet process: using sulfuric acid to decompose phosphate ore to obtain dilute phosphoric acid and solid slag (briefly called phosphogypsum) with $CaSO_4 \cdot nH_2O$ as a main component, and concentrating the dilute phosphoric acid to obtain wet-process phosphoric acid with about 54% phosphoric acid. This process has the following major drawbacks: the first drawback is large consumption of sulfuric acid; the second drawback is that the slag phosphogypsum cannot be used effectively, and sulfuric acid, phosphoric acid and soluble fluorides entrained therein are all soluble in water, and rain wash of the slag piled in the nature is apt to cause serious pollution to the environment; the third drawback is that the resultant phosphoric acid contains higher contain of impurities and is generally only used to produce fertilizer; and the fourth drawback is that high-grade phosphate ore must be used to ensure economy of the product. (2) producing phosphoric acid with a hot process: first, placing phosphate ore, silica and carbonaceous solid reductant in an ore-smelting electric furnace, raising a temperature in the furnace to 1300 with energy of electric arc formed by electrical short-circuiting, reducing phosphor in the phosphate ore in the form of $P_4$, meanwhile converting carbonaceous solid reductant into CO, washing gas mainly containing $P_4$ and CO discharged out of the ore-smelting electric furnace with water, cooling $P_4$ into solid to separate from gas phase to obtain the product yellow phosphorus, igniting and burning exhaust gas containing CO at an outlet of a chimney and exhausting to the atmosphere; heating the obtained $P_4$ to 80 to change it into liquid phase, subjecting it to oxidization combustion reaction with introduced air in a hydration tower to obtain phosphoric anhydride $P_2O_5$, and then absorbing it with water to obtain phosphoric acid. The hot-process production of phosphoric acid has the following main drawbacks: the first drawback is large consumption of electrical energy; the second drawback is that gas discharged out of the ore-smelting electric furnace, from which $P_4$ is already separated, still entrains a large amount of fluorides (existing in the form of $SiF_4$ and HF) and a small amount of un-deposited gas $P_4$, which causes serious pollution to the atmospheric environment; the third drawback is that gas containing a large amount of CO is directly burnt and exhausted, which causes large waste of energy; the fourth drawback is that high-grade phosphate ore needs to be used to ensure economy of the production.

To overcome impact on production of phosphoric acid exerted by shortage of electrical energy, insufficient pyrites resources and gradual reduction of high-grade phosphate core, Occidental Research Corporation of the United States proposed a KPA process in 1980's, i.e., a process of producing phosphoric acid with a rotary kiln (briefly called a phosphoric acid producing process with a kiln) (see Frederic Ledar and Won C. Park, et al., New Process for Technical-Grade Phosphoric Acid, Ind. Eng. Chem. Process Des. Dev 1985, 24, 688-697), and carried out a pilot experiment of a pilot device in a 0.84 m (inner)×9.14 m (see the US patent document U.S. Pat. No. 4,389,384). According to this process, phosphate ore, silica and carbonaceous reductant (coke powder or coal powder) are co-ground so that 50%-85% of the co-ground materials passes a −325 mesh, with 1% bentonite being added to produce balls, which are dried and preheated by a chain-type dryer and then delivered into a rotary kiln with a kiln head in which natural gas is burnt, pellets are reduced in the kiln, a maximum solid temperature is controlled as 1400-1500, pellet $CaO/SiO_2$ mole ratio is adjusted as 0.26-0.55 so that the a melting point of the pellet is higher than a carbon thermal reduction temperature of the phosphate core in the pellets, phosphor is reduced and volatiles out of the pellets in the form of phosphoric vapor, and then oxidized by air introduced in a middle space of the kiln into phosphorous pentoxide, heat resulting from oxidization is then supplied to the reduction reaction, and finally kiln gas containing phosphorous pentoxide is hydrated and absorbed to obtain phosphoric acid.

The idea of the above processing phosphoric acid with a kiln exhibits an excellent industrial application prospect because its principle is to form $P_4$ gas using carbon thermal reduction of the phosphate ore, transfer phosphorus in the phosphate ore to gas phase of the rotary kiln, use a gas-solid separation principle to enable phosphorus to be well separated from other solid substances in the balls, allow the $P_4$ gas transferred into the gas phase of the rotary kiln to go through an oxidization heat liberation reaction with oxygen in the gas phase of the rotary kiln to generate $P_2O_5$, supply the liberated heat to carbon thermal reduction (endothermic reaction) of the phosphate ore in the material balls, and finally hydrate and absorb the kiln gas containing $P_2O_5$ exiting the rotary kiln to obtain industrial phosphoric acid having a cleanliness much higher than the phosphoric acid produced with the wet process. Since the rotary kiln uses primary energy to maintain phosphate ore carbon terminal reduction temperature, and meanwhile flammable substance $P_4$ generated from the phosphate ore carbon terminal reduction and CO are subjected to the combustion heat liberation reaction in the interior of the rotary kiln to replenish the energy needed to maintain the phosphate ore carbon terminal reduction temperature in the rotary kiln, this process substantially reduces energy consumption as compared with the conventional hot process of producing phosphoric acid.

However, the research indicates that it is very difficult to implement the process of producing phosphoric acid with the kiln in large-scale industrial application and practice and its main drawbacks are as follows:

1. A rotary kiln is an apparatus with a kiln body rotating at a certain speed (0.5 r/min-3 r/min), and it is advantageous in continuously performing mechanical turn and mixture of a solid material fed into the kiln to ensure uniformity of heat reception of the solid material at all locations in the kiln. However, the solid material in the kiln must bear a mechanical frictional force resulting from movement of the material.

If a strength of the material is smaller than the received mechanical frictional force, the material can be easily destroyed. A basic principle of the KPA process proposed by ORC corporation of the United States is to co-grind the phosphate ore, the silica and the carbonaceous reductant (coke powder or coal powder) so that 50%-80% of the co-ground materials passes 325 mesh, and then produce them into pellets, the three kinds of substances must be closely copolymerized into a whole so that the mixture does not melt at the carbon thermal reduction temperature of the phosphate ore under the condition the $CaO/SiO_2$ mole ratio in the mixture is 0.26-0.55, and meanwhile carbon reduction of the phosphate ore can be performed smoothly. However, since the reductant carbon is added to the material pellets used in the process, carbon goes through quick oxidation reaction with oxygen in air at a temperature greater than 350 to produce $CO_2$. If a conventional method of consolidating pellets at a high temperature (≥900) at a chain grate in the metallurgical industry is employed, the reducing carbon in the pellets will be all oxidized, the pellets entering the rotary kiln will lose the reductant, carbon thermal reduction reaction of the phosphorus naturally cannot be performed, and the process fails as a result. If only the bentonite is added as a bonding agent of the pellets to perform drying and dehydration at a temperature less than 300, an anti-pressure strength of the pellets is only about 10 KN per ball, with a falling strength ≤1 time per meter; since an acting mechanism of the bentonite is mainly to use interlayer water in its substance structure to adjust a moisture content release speed during the drying of the pellets and improve a burst temperature of the pellets during the drying, and bentonite itself does not play a remarkable role in improving the strength of the pellets. After such pellets are fed into the rotary kiln and before the rotary kiln temperature value reaches 900, since the pellets entering the kiln cannot bear the mechanical frictional force resulting from movement of material balls in the pellets, a lot of said pellets are pulverized, and thereafter the phosphate ore powder, silica powder and carbonaceous reductant forming the pellets will separate, the phosphate ore powder after pulverization causes failure of reduction of phosphorus as it cannot get in close contact with carbonaceous reductant. More seriously, once the phosphate ore powder separates from silica powder, its melting point abruptly falls below 1250. When such powder-like phosphate ore passes through a high-temperature reducing area (with a material layer temperature of 1300 or so) of the rotary kiln, it will totally changes from solid phase into a liquid phase, and thereby adheres to a liner of the rotary kiln to form high-temperature ringing of the rotary kiln, which hinders normal rotation of the materials in the rotary kiln so that a majority of materials added into the rotary kiln overflows from the rotary kiln from a feeding end of the rotary kiln, high-temperature reduction of phosphorus cannot be achieved and the process fails. It can be seen that the raw materials entering the kiln have their intrinsic drawbacks, any industrialized, large-scale or commercialized application of the above-mentioned KPA technology has not yet been witnessed so far.

2. Regarding the KPA process with the phosphate ore pellets with carbon being added, a solid material area below a material layer in the rotary kiln belongs to a reduction zone, and a gas flow area of the rotary kiln is above the material layer and belongs to an oxidization zone, the feed pellets are added from a kiln tail of the rotary kiln and discharged out of a kiln head of the rotary kiln by virtue of its own gravity and a frictional force resulting from rotation of the rotary kiln, a burner for burning fuel in the rotary kiln is mounted at the kiln head of the rotary kiln, fume resulting from the burning is introduced out by a blower at the kiln tail, a micro negative pressure is maintained in the rotary kiln, and the gas flow is opposite to a movement direction of the materials. Since there is not a mechanical isolation area between the reduction zone (solid material layer area) and the oxidization zone (the gas flow area above the solid material layer area of the rotary kiln) of the rotary kiln, the material balls exposed on the surface of the solid material layer area and $O_2$, $CO_2$ in the gas flow in the oxidization zone are subjected to convective mass transfer; on the one hand, this causes the reductant in the material balls to be partially oxidized before the material balls are heated by the gas flow heat transfer to the carbon reduction temperature of the phosphate ore so that the material balls are not sufficiently reduced due to shortage of carbonaceous reductant in the reduction zone of the rotary kiln; more seriously, the material balls exposed to the surface of the material layer at the high-temperature area of the rotary kiln is further subjected to chemical reaction with $P_2O_5$ already generated from reduction in the kiln gas to produce calcium metaphosphate, calcium phosphate and other metaphosphates or phosphates, thereby causing the phosphorus already reduced into the gas phase to return to the material balls again and form a layer of white crust rich in $P_2O_5$ on the surface of the material balls, the layer of crust generally having a thickness of 300 μm-1000 μm, the content of $P_2O_5$ in the layer of crust topping 30%; as a result, $P_2O_5$ transferred from the material balls to the gas phase does not exceed 60%, which cause a lower yield ratio of $P_2O_5$ in the phosphate ore and thereby causes waste of mineral resources and large rise of the phosphoric acid production cost so that the above KPA process losses value in respect of commercial application and industrial spread. Researchers desire gas volatized from the material layer to isolate the reduction zone from the oxidization zone in the rotary kiln, but industrial experiments performed in a rotary kiln with an inner diameter 2 m show that the phenomena of white crust rich in $P_2O_5$ on the surface of the pellets still cannot be avoided.

Due to the above-mentioned technical drawbacks, it is still very difficult to use the KPA process proposed by ORC Corporation in large-scale industrial application and practice to produce phosphoric acid.

Joseph A. Megy proposes some improved technical methods with respect to the KPA process (see US patent document U.S. Pat. No. 7,910,080B), i.e., on the premise of maintaining the basis process of KPA unchanged, providing a material stopping ring on a kiln head material discharging end of the cylinder of the rotary kiln to improve a solid material filling rate of the rotary kiln, and meanwhile increasing the diameter of the rotary kiln to reduce a surface area to volume ratio of an inner material layer of the rotary kiln, reduce probability of the material of the material layer being exposed to the surface of the solid material layer to shorten the time that the reductant carbon in the material balls is oxidized by $O_2$ in the kiln gas in the rotary kiln, reduce burn of the reductant carbon before the material balls reach the reduction zone of the rotary kiln and meanwhile decease generation of phosphates or metaphosphates on the surface of the material balls in the high-temperature area of the rotary kiln. In addition, according to the process, it is desired that partial petroleum coke is added to the materials entering the rotary kiln so that reducing gas generated by a volatile matter in the petroleum coke due to heat reception and volatilization is used to cover between the material layer and the gas flow oxidization area of the rotary kiln to further block the probability of the $O_2$ and $P_2O_5$ in the gas flow in the rotary kiln reacting with the material balls to ensure normal operation of the process. However, increase of the filling rate of the rotary kiln allows the material balls to bear larger mechanical frictional force in the rotary kiln, thereby causing a larger proportion of pulverization of the material balls in the rotary kiln, and forming more substances with a melting point lower than the phosphate ore carbon thermal reduction temperature so that the high-temperature ringing of the rotary kiln becomes quicker and more serious and earlier failure of the process is caused. In addition, the volatile matter generated by added small amount of petroleum coke is not sufficient to produce sufficient gas and it is difficult to form an effective isolation layer between the solid material layer of the rotary kiln and the gas flow area in the rotary kiln. If an excessive amount is added, the materials in the rotary kiln will entrain a large amount of fuel so that in a slag ball cooling machine in the subsequent process, the redundant fuel is confronted with the air for cooling the slag balls and burns rapidly, a large amount of heat resulting from the burning not only increases the difficulty in cooling the high-temperature slag balls exiting the rotary kiln but also substantially increases the production cost of the process and makes implementation of the commercialized and large-scale application of the process impossible.

However, in subsequent research, we finds a series of new technical problems, of which there are some technical problems reflected in process of pretreatment of raw material. First, it is difficult for mixing the inner balls containing binding agent uniformly, so that CaO/SiO2 molar ration of feeding balls is difficult to stabilize at the set value, the feeding ball deviated from the set value is prone to form a soft frit ring at a high-temperature reduction zone and further resulted in the failure process; secondly, the binding agent used in the raw material pretreatment stage is majority a simple mixing of the existing binding agents, the bonding effect is not ideal, and the bonding performance is not stable enough, which makes the mechanical properties and mechanical strength of the prepared composite pellets not stable enough; furthermore, there are not optional industrial apparatus and suitable drying method for dying composite pellets, burst and cracking are apt to occur during the drying of pellets, and cracked composite pellets enter the rotary kiln and are pulverized at a high-temperature reduction zone in the rotary kiln to form a ring, and further resulted in the failure process.

Hence, to further reduce the production cost and power consumption in the current kiln phosphoric acid process, facilitate industrialization and commercialization of the application, and carry out long-period product in a more stable, the process of the raw material preparation need to be modified and improved by those skilled in the art.

SUMMARY OF THE INVENTION

The technical problem to be solved by the present invention is to overcome drawbacks in the prior art and provides a composite pellet used as a raw material in kiln phosphoric acid process with a smaller ratio fluctuation range, more stable quality, and higher strength, and accordingly provides a method of the preparation of the composite pellets aforementioned with a more reasonable step, higher utilization of raw materials, more energy saving, better product performance.

To solve the above technical problem, the present invention proposes the following technical solutions:

The present invention provides a composite pellet used as a raw material in kiln phosphoric acid process, the composite pellet is a core-shell shaped structure with an inner ball encapsulated with a shell, the inner ball mainly consists of a inner ball material and a binding agent, and the shell mainly consists of a cladding material and a binding agent; the inner ball material mainly consists of a carbonaceous reductant powder, and phosphate ore powder and silica powder, the addition quantity of the binding agent in the inner ball is 1%-12% of the mass of the inner ball material; the cladding material mainly consists of a carbonaceous reductant powder and a silica powder, the addition quantity of the binding agent in the shell is 1%-12% of the mass of the cladding material; the inner ball is combined with the shell through the binding agent to form the core-shell shaped structure.

The present invention also provides a forming method of composite pellet, comprises the following steps:

(1) Preparation of Inner Ball: a carbonaceous reductant powder, a phosphate ore powder, a silica powder and a binding agent are mixed according to a proportional requirement, feeding a mixed material into a pelletiser for pelleting treatment, and inner ball is obtained upon completion of the pelleting;

(2) Preparation of Cladding Material: a carbonaceous reductant powder, a silica power and a binding agent are mixed according to proportional requirements to obtain a cladding material;

(3) Forming of Composite Pellet: the inner ball obtained in step (1) is subjected to screening treatment to obtain inner ball with a granularity meeting the process requirement, feeding the inner ball into another pelletiser for cladding treatment, introducing the cladding material into the pelletiser, composite green pellet is obtained upon completion of the cladding treatment;

(4) Drying and Solidification: delivering the composite green pellet into a dryer for drying and solidification and finally forming to obtain the composite pellet.

LISTING OF PARTS

Figure 1:
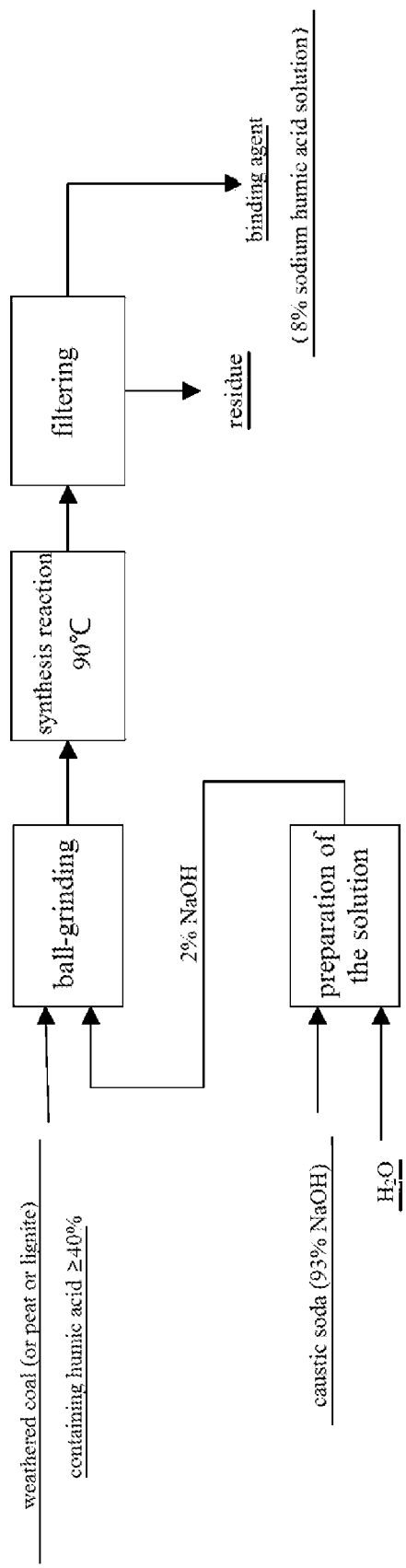
FIG. 1 is a schematic diagram of a process flow of preparation of the binding agent in a specific embodiment of the present invention.

The reference number 1 a driving member; 2 a feed hopper; 3 an agitator; 4 a casing; 5 a material turning plough; 6 a discharge port; 7 a material loading cart; 8 a drying furnace body; 9 a deduster; 10 a low-temperature drying stage; 11 an intermediate-temperature drying stage; 12 a high-temperature drying stage; 13 an air inlet; 14 a temperature-preserving layer; 15 an air outlet; 16 an air vent.

DETAILED DESCRIPTION OF THE INVENTION

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be through and complete, and will fully convey the scope of the invention to those skilled in the art. Among other things, the present invention may be embodied as systems, methods or devices. The following detailed description should not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on". The term "coupled" implies that the elements may be directly connected together or may be coupled through one or more intervening elements. Further reference may be made to an embodiment where a component is implemented and multiple like or identical components are implemented.

While the embodiments make reference to certain events this is not intended to be a limitation of the embodiments of the present invention and such is equally applicable to any event where goods or services are offered to a consumer.

In an embodiment of the present invention, the present invention provides a composite pellet used as a raw material in kiln phosphoric acid process, the composite pellet is a core-shell shaped structure with an inner ball encapsulated with a shell, the inner ball mainly consists of a inner ball material and a binding agent, and the shell mainly consists of a cladding material and a binding agent; the inner ball material mainly consists of a carbonaceous reductant powder, and phosphate ore powder and silica powder, the addition quantity of the binding agent in the inner ball is 1%-12% of the mass of the inner ball material; the cladding material mainly consists of a carbonaceous reductant powder and a silica powder, the addition quantity of the binding agent in the shell is 1%-12% of the mass of the cladding material; the inner ball is combined with the shell through the binding agent to form the core-shell shaped structure.

In an embodiment of the present invention, the addition quantity of the binding agent in the inner ball is 1%-10% of the mass of the inner ball material; the addition quantity of the binding agent in the shell is 1%-10% of the mass of the cladding material; the inner ball is combined with the shell through the binding agent to form the core-shell shaped structure.

In an embodiment of the present invention, the addition quantity of the binding agent in the inner ball is 2%-6% of the mass of the inner ball material; the addition quantity of the binding agent in the shell is 2%-6% of the mass of the cladding material; the inner ball is combined with the shell through the binding agent to form the core-shell shaped structure.

In an embodiment of the present invention, the carbonaceous reductant powder is selected from the group consisting of anthracite, bituminous coal, coke, petroleum coke, and combination thereof.

In an embodiment of the present invention, the binding agent is a mixed solution containing sodium humic acid, the sodium humate in the binding agent being 4%-20% mass percentage concentration, the binding agent is obtained after mixing the coal containing humic material with sodium hydroxide solution, reacting and filtering.

In an embodiment of the present invention, the coal is selected from the group consisting of weathered coal, peat, lignite, and combination thereof.

In an embodiment of the present invention, the sodium humate in the binding agent being 4%-16% mass percentage concentration.

In an embodiment of the present invention, the sodium humate in the binding agent being 8%-12% mass percentage concentration.

In other embodiment of the present invention, various binding agent products employed in conventional KPA process also can be the binding agent.

In an embodiment of the present invention, the phosphate ore powder of the composite pellets is a product obtained after homogenizing the phosphate ore powder that grinded and stored in the homogenization silo in a form of gap tape homogenization or continuous homogenization by using compressed air, and the homogenization value greater than 4.

In an embodiment of the present invention, in the inner ball material, $CaO/SiO_2$ mole ratio is less than 0.6 or greater than 6.5, and the amount of carbonaceous reductant powder is 1.0-2.0 times a theoretical amount of $P_2O_5$ in phosphate ore powder.

In an embodiment of the present invention, in the inner ball material, $CaO/SiO_2$ mole ratio is 0.3, In an embodiment of the present invention, a mass ratio of carbonaceous reductant powder to silica powder in a cladding material is 1.5-9:1.

In an embodiment of the present invention, a mass ratio of carbonaceous reductant powder to silica powder in a cladding material is 1.5-5:1.

In an embodiment of the present invention, a mass ratio of carbonaceous reductant powder to silica powder in a cladding material is 2.5:1.

The present invention also provides a forming method of composite pellet, comprises the following steps:

(1) Preparation of Inner Ball: a carbonaceous reductant powder, a phosphate ore powder, a silica powder and a binding agent are mixed according to a proportional requirement, feeding a mixed material into a pelletiser for pelleting treatment, and inner ball is obtained upon completion of the pelleting;

(2) Preparation of Cladding Material: a carbonaceous reductant powder, a silica power and a binding agent are mixed according to proportional requirements to obtain a cladding material;

(3) Forming of Composite Pellet: the inner ball obtained in step (1) is subjected to screening treatment to obtain inner ball with a granularity meeting the process requirement, feeding the inner ball into another pelletiser for cladding treatment, introducing the cladding material into the pelletiser, composite green pellet is obtained upon completion of the cladding treatment;

(4) Drying and Solidification: delivering the composite green pellet into a dryer for drying and solidification and finally forming to obtain the composite pellet.

In an embodiment of the present invention, the step of preparation of inner ball in the forming method of composite pellet, comprises the following steps: adding the carbonaceous reductant powder, phosphate ore powder and silica powder to an intensive mixer or a damp mill according to a proportional requirement, and meanwhile adding a binding agent, feeding the mixed material which is mixed sufficiently and uniformly by a weighing and feeding device into a pelletiser for pelleting treatment, adding the binding agent in an application form of droplets and/or mist, an addition amount of the binding agent is 1%-12% of mass of the mixed material, and inner ball is obtained upon completion of the pelleting;

In an embodiment of the present invention, the step of preparation of cladding material in the forming method of composite pellet, comprises the following steps: adding the carbonaceous reductant powder and silica power to an intensive mixer or a damp mill according to proportional requirements, meanwhile adding a binding agent, mixing sufficiently and uniformly to obtain a cladding material and feeding the cladding material into a cladding material silo;

In an embodiment of the present invention, the step of forming of composite pellet in the forming method of composite pellet, comprises the following steps: inner ball obtained in step (1) is subjected to bi-layered roller-type screening treatment to obtain inner ball with a granularity meeting the process requirement, feeding the inner ball into another pelletiser for cladding treatment, meanwhile, introducing (by an electronic weighing and feeding device in said pelletiser according to a corresponding proportion set with respect to the inner ball material) the cladding material into the pelletiser, additionally adding the binding agent in an application form of droplets and/or mist during the cladding treatment, the addition amount of the binding agent is 1%-12% of the mass of the cladding material, composite green pellet is obtained upon completion of the cladding treatment;

In an embodiment of the present invention, a method of preparing the binding agent used in the present embodiment specifically comprises the following steps:

(1) Preparation of Raw Material: selecting coal containing humic acid and caustic soda as raw material, mixing caustic soda with water to obtain sodium hydroxide solution;

(2) Ball-Grinding and Mixing: ball-grinding and mixing the coal and sodium hydroxide solution in step (1) with a 1:3-10 solid-to-liquid ratio;

(3) Synthesis Reaction: feeding the mixed material in step (2) into a reaction tank with an agitator, starting the agitator, heating to 40-95° C. to perform synthesis reaction;

(4) Filtering: filtering the reaction product in step (3) to obtain filtrate as the binding agent.

In an embodiment of the present invention, the coal in step (1) of preparation the binding agent generally with a granularity 20 mm.

In an embodiment of the present invention, the time of the ball-grinding in step (2) of the preparing the binding agent is 5 min-120 min.

In an embodiment of the present invention, the time of reaction in step (3) of the preparing the binding agent is not less than 30 min.

In an embodiment of the present invention, the time of reaction in step (3) of the preparing the binding agent is 30 min-180 min.

In an embodiment of the present invention, in step (1) of the preparing the binding agent, the coal material refers to weathered coal, peat and/or lignite containing humic acid above 20%.

In an embodiment of the present invention, in step (1) of the preparing the binding agent, the coal material refers to weathered coal, peat and/or lignite containing humic acid above 40%.

In an embodiment of the present invention, in step (1) of the preparing the binding agent, a mass percentage concentration of the sodium hydroxide solution is controlled in a range of 1%-10%.

In an embodiment of the present invention, in step (1) of the preparing the binding agent, a mass percentage concentration of the sodium hydroxide solution is controlled in a range of 2%-10%.

In an embodiment of the present invention, the intensive mixer in step of the preparation of inner ball and preparation of cladding material includes an obliquely rotatable mixing barrel, a rotatable agitator is mounted in the mixing barrel; upon mixing, a rotation direction of the mixing barrel is contrary to a rotation direction of the agitator to allow the mixed materials in the mixing barrel to form a turbulence therein, thereby achieving an effect of agitating sufficiently and uniformly.

In an embodiment of the present invention, in the step of the preparation of inner ball and forming of composite pellet, the pelletiser is a disc type pelletiser; feeding all the inner balls which is not meeting the process granularity requirement screened out in step (3) into a roller mill or damp mill for milling, and selectively adding the inner ball material according to a requirement for material humidity during milling, and then returning into the intensive mixer or damp mill in step (1) to form closed-loop circulation.

In an embodiment of the present invention, in the forming method, the dryer used in the step of drying and solidification is a scale plate dryer, and the scale plate dryer is divided into a total of three drying stages in a delivery direction of the composite green pellets, including a low-temperature drying stage, an intermediate-temperature drying stage and a high-temperature drying stage.

In an embodiment of the present invention, low-temperature hot air a range of 100-200 introduced into the low-temperature drying stage performs up-down air pumping or down-up wind blowing so that the low-temperature hot air vertically passes through a material layer and performs through-drying for the composite green pellets; the low-temperature hot air originates from exhaust gas discharged at a high-temperature hot air outlet of the high-temperature drying stage.

In an embodiment of the present invention, intermediate-temperature hot air a range of 150-250 introduced into the intermediate-temperature drying stage performs up-down air pumping or down-up wind blowing so that the intermediate-temperature hot air vertically passes through the material layer and performs through-drying for the composite green pellets.

In an embodiment of the present invention, high-temperature hot air a range of 200-350 introduced into the high-temperature drying stage performs up-down air pumping or down-up wind blowing so that the high-temperature hot air vertically passes through the material layer and performs through-drying for the composite green pellets.

EXAMPLES

The embodiment provides a composite pellets used as a raw material in kiln phosphoric acid process in the present invention is a core-shell shaped structure with an inner ball encapsulated with a shell, the inner ball mainly consists of a inner ball material and a binding agent, and the shell mainly consists of a cladding material and a binding agent; the inner ball material mainly consists of a carbonaceous reductant powder, and phosphate ore powder and silica powder, the addition quantity of the binding agent in the inner ball is 6% (or 1%-10%) of the mass of the inner ball material; the addition quantity of the binding agent in the shell is 6% (or 1%-10%) of the mass of the cladding material; the inner ball is combined with the shell through the binding agent to form the core-shell shaped structure.

The binding agent in the present embodiment is a mixed solution containing sodium humate, the sodium humate in the binding agent being 8% mass percentage concentration, the binding agent is obtained after mixing weathered coal (or peat or lignite) containing humic acid with sodium hydroxide solution, reacting and filtering. The phosphate ore powder of the composite pellets in the present embodiment is a product obtained after homogenizing the phosphate ore powder thar grinded and stored in the homogenization silo in a form of gap tape homogenization or continuous homogenization by using compressed air, and the homogenization value greater than 4; In the inner ball material, $CaO/SiO_2$ mole ratio is 0.3 (less than 0.6 or greater than 6.5), and the amount of carbonaceous reductant powder is above 1.5 times a theoretical amount of $P_2O_5$ in phosphate ore powder; a mass ratio of carbonaceous reductant powder to silica powder in a cladding material is 2.5:1 (in a range of 1.5-5:1).

A method of preparing the binding agent used in the present embodiment specifically comprises the following steps:

(1) Preparation of Raw Material: selecting weathered coal (or peat or lignite) containing humic acid as a raw material, content of the humic acid contained in the decomposed coal in the present embodiment being above 40%; mixing caustic soda (93% sodium hydroxide) with water to obtain sodium hydroxide solution with 2% mass percentage concentration;

(2) Ball-Grinding and Mixing: ball-grinding and mixing the above decomposed coal and sodium hydroxide solution with a 5:1 liquid-to-solid ratio for 20 min;

(3) Synthesis Reaction: feeding the mixed material into a reaction tank with an agitator, starting the agitator, heating to 90 to perform synthesis reaction for 30 min;

(4) Filtering: filtering the reaction products to obtain filtrate as the binding agent.

Figure 2:
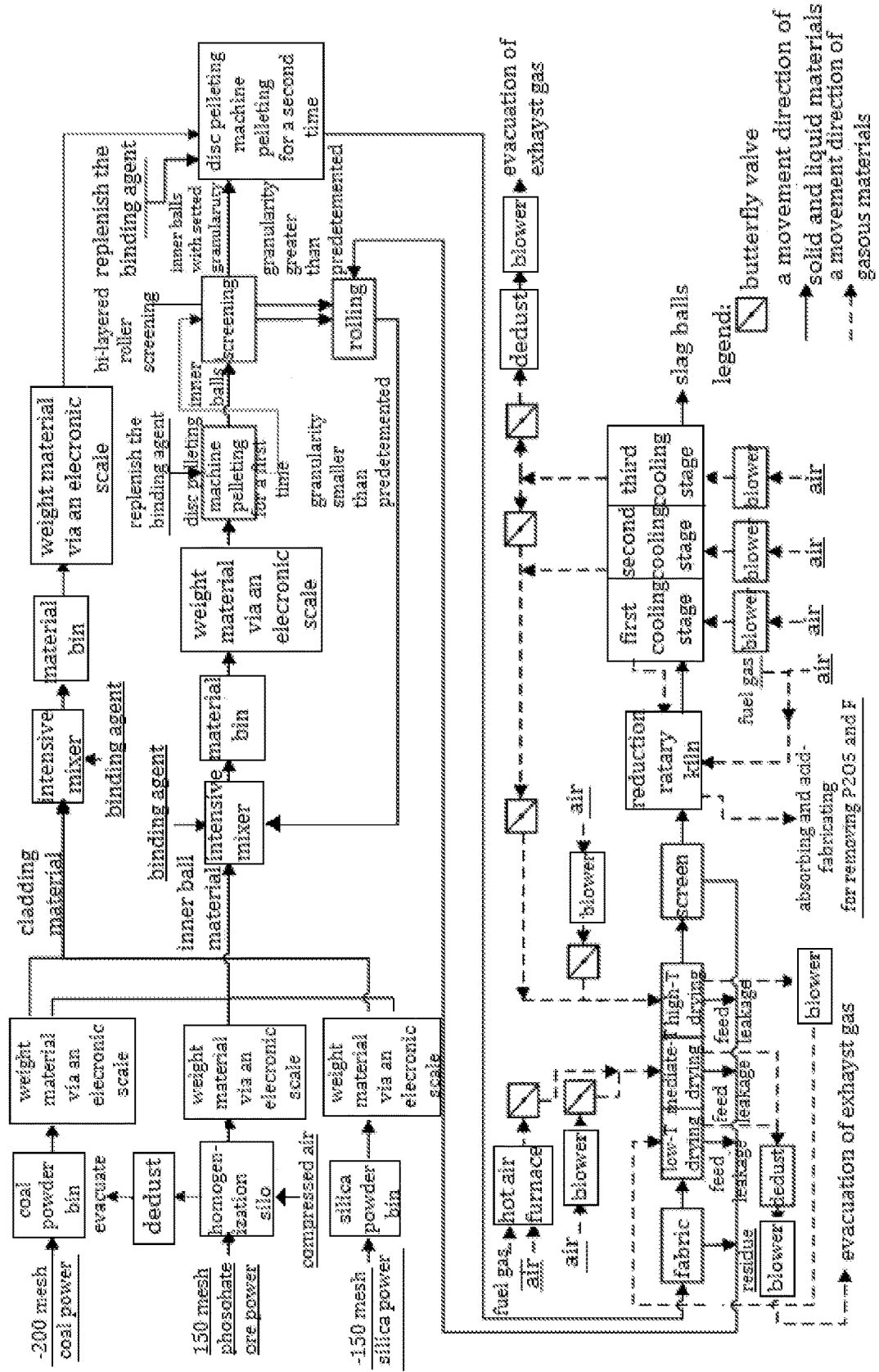
FIG. 2 is a schematic diagram of a process flow of a raw material pretreating step in a specific embodiment of the present invention.

As shown in FIG. 2, a forming of composite pellets method according to the present embodiment, specifically comprises the following steps:

1. Preparation of Inner Balls

The carbonaceous reductant powder (the present embodiment selects coal powder above −200 mesh, e.g., coke powder, anthracite powder or petroleum coke), phosphate ore powder (above −150 mesh) and silica powder (above −150 mesh) are added to an intensive mixer according to a proportional requirement in composite pellets, and ingredients may be weighed by an electronic scale, and meanwhile a binding agent according to the present embodiment is added in the above-mentioned amount.

Figure 3:
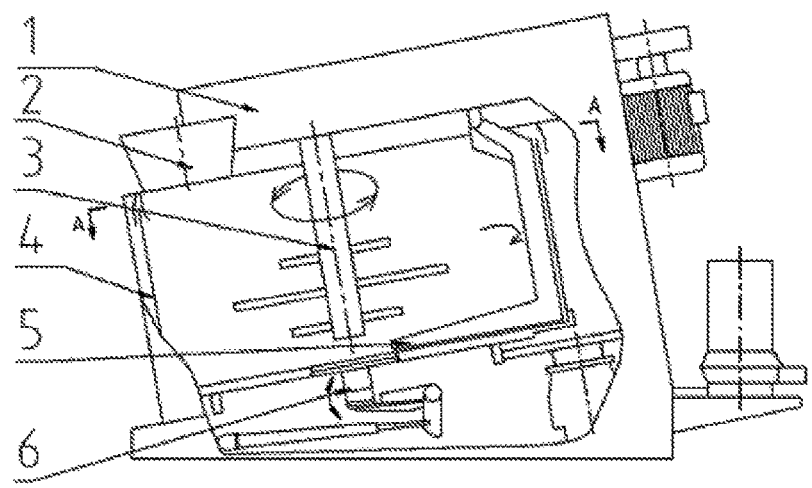
FIG. 3 is a structural schematic view of an intensive mixer used in a specific embodiment of the present invention.
Figure 4:
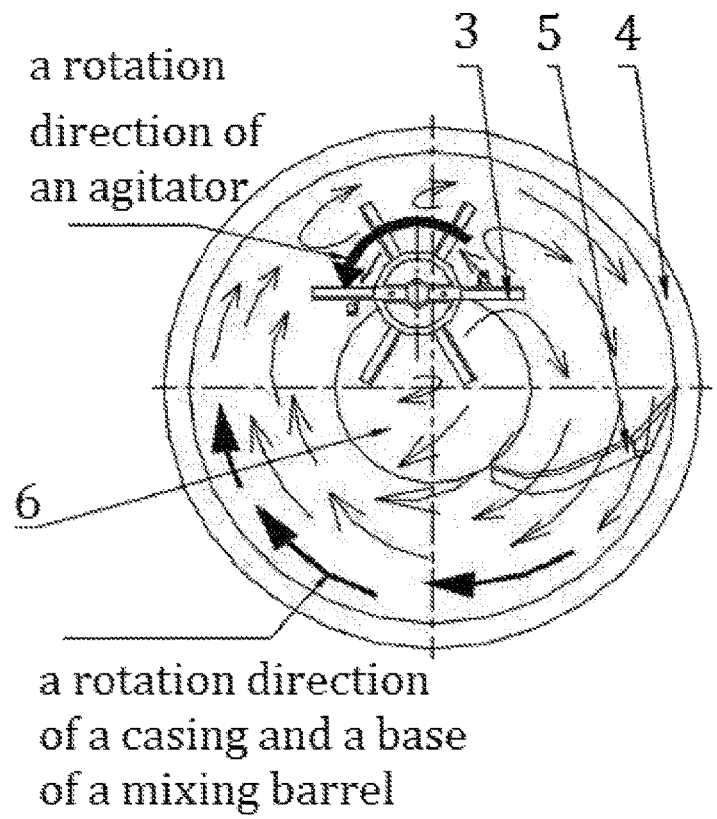
FIG. 4 is a view integrating a sectional view taken along A-A in FIG. 3 and a working principle view.

As shown in FIG. 3, the intensive mixer used in the present embodiment comprises an obliquely rotatable mixing barrel, the mixing barrel comprises a casing 4 and a rotatable agitator 3 mounted in the barrel, a feed hopper 2 and a driving member 1 are disposed above the mixing barrel, a material turning plough 5 is disposed on one side of the barrel, a discharge port 6 is disposed on a bottom of the barrel; a working principle of the intensive mixer is as follows: upon mixing, a rotation direction of the mixing barrel is contrary to a rotation direction of the agitator (see FIG. 4); after the above raw materials are fed in the oblique rotatable mixing barrel, they rotate relative to the agitator which rotates inversely so that disperse mixed materials therein form a circulating material flow and thereby function to mix intensively; inverse rotation of the agitator and the mixing barrel may enable mixed materials to form a turbulence therein, thereby achieving an effect of agitating sufficiently and uniformly; materials are fed continuously into and discharged continuously out of the intensive mixer to ensure continuity of the production procedure.

The mixed material which is mixed sufficiently and uniformly is fed into the material bin whose lower portion is mounted with a weighing and feeding device which weighs with an electronic scale, such weighing and feeding device may be a feeding device combining a disc feeding machine with an electronic scale, a weight weighed by the electronic scale is compared with a predetermined feed quantity; when a deviation occurs, a computer control system automatically adjusts a rotation speed of the disc of the disc feeding machine to make the quantity of the fed material equal to the predetermined feed quantity (other weighing and feeding devices having an electronic scale may be used directly).

The mixed material which is mixed sufficiently and uniformly is fed by the weighing and feeding device into a disc pelletiser for pelleting treatment, the above-mentioned binding agent in the embodiment is additionally added in an application form of droplets and/or mist, the addition amount of the binding agent is 4%-6% of mass of the mixed material, and inner balls are obtained upon completion of the pelleting.

2. Preparation of Cladding Material:

The aforesaid carbonaceous reductant powder and silica power are added to another intensive mixer according to proportional requirements, meanwhile the binding agent of the present embodiment is added according to the addition quantity of the composite pellets of the present embodiment, they are mixed sufficiently to obtain a cladding material; the intensive mixer in this step is identical with the intensive mixer used in step 1 in respect of the working principle and functional structure. The intensive mixer may also be replaced with a roller mill or damp mill which continuously feeds material and continuously discharges material.

3 The Forming of Composite Green Pellets:

Inner balls getting out of a ball disc in step 1 are subjected to bi-layered roller-type screening treatment by using a bi-layer roller-type screening machine to obtain inner balls with a granularity meeting the process requirement, said inner balls are fed into another disc pelletiser for cladding treatment, meanwhile the cladding material obtained in step 2 is introduced in said disc pelletiser, the above binding agent is additionally added in an application form of droplets and/or mist during the cladding treatment, the addition amount of the binding agent is 4%-6% of the mass of the cladding material, an isolation layer separating a reduction zone from an oxidization zone is formed externally the inner balls upon completion of the cladding treatment to obtain the composite green pellets.

After the by-layered roller-type screening treatment, unqualified inner balls greater than or smaller than a predetermined particle diameter are screen away and fed into the roller mill (or damp mill) for milling, during milling the inner ball material in the previous ingredient-formulating step is selectively added according to the roller mill's requirement for material humidity, and then returns into the intensive mixer in the above step 1 to form closed-loop circulation to sufficiently use the process raw material and reduce discharge and waste of the waste material during the process.

The composite green pellets fabricated in the present embodiment has an anti-pressure strength 10N per ball, and a falling strength of about 10 times per 0.5 meter, and furthermore, a fluctuation range of $CaO/SiO_2$ mole ratio in the composite green pellets in the present embodiment can be controlled less than 5%.

4 Drying and Solidification:

The composite green pellets obtained after step 3 are delivered into a scale plate dryer for drying and solidification.

Figure 5:
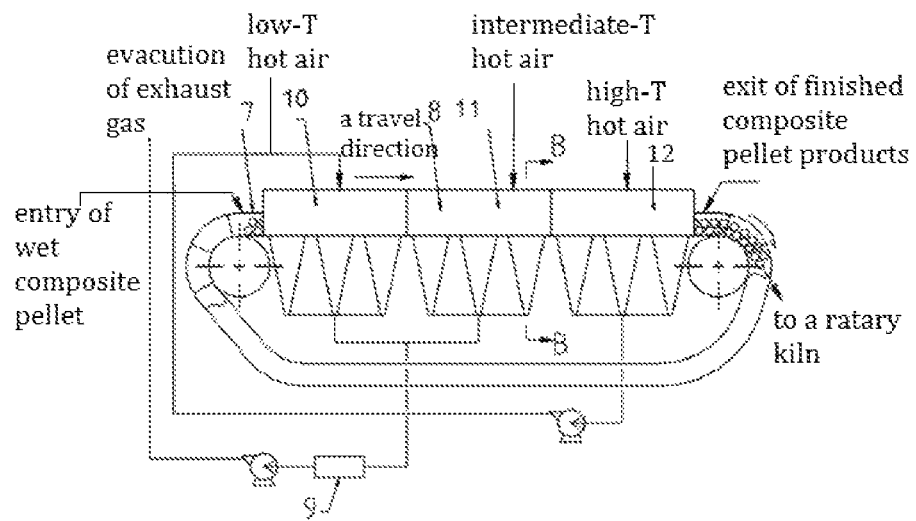
FIG. 5 is a structural schematic diagram of a scale plate dryer used in a specific embodiment of the present invention.
Figure 6:
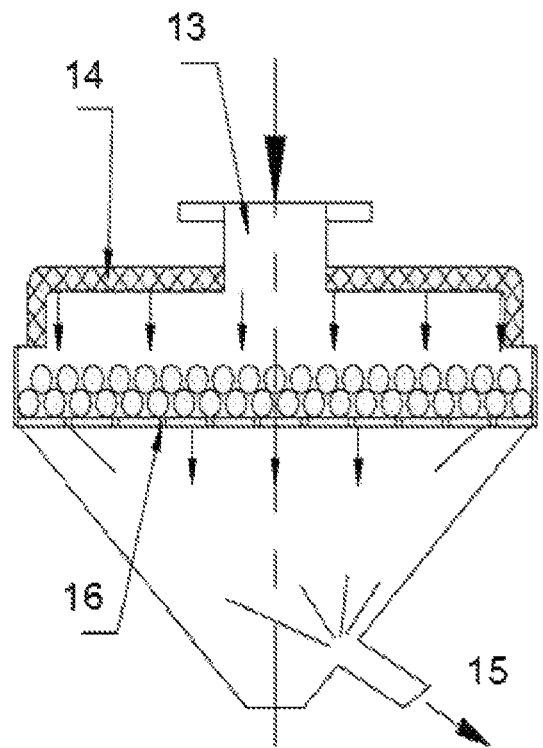
FIG. 6 is a view integrating a sectional view taken along B-B in FIG. 5 and a working principle view.

As shown in FIG. 5 and FIG. 6, the scale plate dryer in the present embodiment comprises a drying furnace body 8, the drying furnace body 8 comprises a low-temperature drying stage 10, an intermediate-temperature drying stage 11 and a high-temperature drying stage 12, a hot air inlet 13 is disposed on top of the drying furnace body 8, an air outlet 15 is disposed on a bottom, a temperature preserving layer 14 is cladded peripherally, material loading carts 7 are disposed in a chamber of the drying furnace body 8, several material loading carts 7 are connected consecutively to form a ring, an air vent 16 is provided on the material loading cart 7, chain transmission is employed, the material loading carts 7 are dragged via a chain with seats to rotate cyclically to achieve a purpose of continuous drying and delivery. The bottom of the drying furnace body 8 is provided with a deduster 9 to collect and process fume and dust generated during the drying. During delivery of the composite green pellet materials, dry hot air is introduced from up to down in a direction perpendicular to the movement of the material to achieve the purpose of drying.

A specific working principle of the scale plate dryer in the present embodiment is that a total of three drying stages, namely, low-temperature, intermediate-temperature and high-temperature drying stages are divided along a movement and delivery direction of the composite green pellets material loading carts 7. The composite green pellets first enter the low-temperature drying stage 10, low-temperature hot air of 130-200 is introduced in the low-temperature drying stage 10 through up-down air pumping or down-up air blowing so that the low-temperature hot air vertically passes through the composite green pellet layer and performs through-drying for the composite green pellets; the low-temperature hot air originates from exhaust gas discharged at the high-temperature hot air outlet of the high-temperature drying stage, and is introduced to the low-temperature drying stage 10 via a blower; the low-temperature drying stage 10, on the one hand, uses residual heat of low-temperature hot air discharged out of the high-temperature drying stage 12, and on the other hand, can effectively prevent damages to the pellets caused by burst of wet composite green pellets and ensure the quality of composite green pellets entering the kiln subsequently due to a lower gas flow temperature of the low-temperature drying stage 10. The composite green pellets after being dried in the low-temperature drying stage 10 then enter the intermediate-temperature drying stage 11 for drying, intermediate-temperature hot air of 220-250 is introduced in the intermediate-temperature drying stage 11 through up-down air pumping or down-up air blowing so that the intermediate-temperature hot air vertically passes through the material layer and performs through-drying for the composite green pellets; intermediate-temperature hot air not carrying moisture is introduced into the intermediate-temperature drying stage to form a higher humidity difference, which quickens the drying of the pellets in the case of ensuring the pellets do not burst. The composite green pellets after being dried in the intermediate-temperature drying stage 11 then enter the high-temperature drying stage 12 for drying, moisture content in the composite pellets finally entering the high-temperature drying stage 12 already falls below 4%, high-temperature hot air of 250-350 is introduced in the high-temperature drying stage 12 through up-down air pumping or down-up air blowing so that the high-temperature hot air vertically passes through the material layer and performs final drying for the composite green pellets. The high-temperature hot air of the high-temperature drying stage 12 preferably originates from use of residual heat of the exhaust gas in subsequent discharge-cooling stage of the rotary kiln, or a hot air furnace may be additionally arranged to supply hot air. The exhaust gas discharged by the low-temperature drying stage 10 and intermediate-temperature drying stage 11 may be collected by a fan, is dedusted by a deduster 9 and exhausted into the atmosphere after reaching the environment protection requirement.

Moisture content in the composite pellets obtained after drying and solidification is controlled ≤1.0%, an average anti-pressure strength of the pellets reaches ≥250 KN per ball, and a falling strength reaches ≥20 times per meter, and it can be ensured that the composite pellets are not destroyed during subsequent rotation in the reducing rotary kiln so as to ensure smooth performance of the reduction procedure of the composite pellets.

Among the composite pellets getting out of the dryer in the present embodiment, the composite pellets damaged during drying (those pellets with a diameter less than 5 mm) are screened via a vibrating screen to reduce the amount of powder material subsequently entering the rotary kiln and thereby delay a ringing cycle of the material in the high-temperature stage in the rotary kiln. The composite pellets getting out of the vibrating screen are fed via an air lock valve through a discharge duct from the kiln tail box of the rotary kiln to the rotary kiln for subsequent high-temperature reducing treatment.

The invention claimed is:

1. A forming method of composite pellet, comprises the following steps:
   (1) Preparing an Inner Ball: a carbonaceous reductant powder, a phosphate ore powder, a silica powder and a binding agent are mixed, feeding the mixed material into a pelletiser for pelleting treatment, and the inner ball is obtained upon completion of the pelleting, wherein in the inner ball $CaO/SiO_2$ mole ratio is less than 0.6 or greater than 6.5, and the amount of carbonaceous reductant powder is 1.0-2.0 times a theoretical amount of $P_2O_5$ in phosphate ore powder, the binding agent is 1%-12% of the mixed material by mass;
   (2) Preparing a Cladding Material: a carbonaceous reductant powder, a silica powder and a binding agent are mixed to obtain the cladding material, wherein a mass ratio of the carbonaceous reductant powder to the silica powder in the cladding material is 1.5-9:1, the binding agent is 1%-12% of the cladding material by mass;
   (3) Forming a Composite Pellet: the inner ball obtained in step (1) is subjected to screening treatment to obtain inner ball with a granularity meeting the process requirement, feeding the inner ball into another pelletiser for cladding treatment, introducing the cladding material into the pelletiser, composite green pellet is obtained upon completion of the cladding treatment;

(4) Drying and Solidifying: delivering the composite green pellet into a dryer for drying and solidifying, and finally forming the composite pellet, wherein the dryer used in the step of drying and solidifying is a scale plate dryer, and the scale plate dryer is divided into three drying stages in a delivery direction of the composite green pellets, including a low-temperature drying stage, an intermediate-temperature drying stage and a high-temperature drying stage.

2. A forming method according to claim 1, wherein the step (1) of the forming method comprises the following steps: adding the carbonaceous reductant powder, phosphate ore powder and silica powder to an intensive mixer or a damp mill, and meanwhile adding the binding agent, feeding the mixed material which is mixed sufficiently and uniformly by a weighing and feeding device into a pelletiser for pelleting treatment, adding the binding agent in an application form of droplets and/or mist, an addition amount of the binding agent is 1%-12% of mass of the mixed material, and the inner ball is obtained upon completion of the pelleting.

3. A forming method according to claim 2, wherein the intensive mixer in step of the preparation of inner ball includes an obliquely rotatable mixing barrel, a rotatable agitator is mounted in the mixing barrel; upon mixing, a rotation direction of the mixing barrel is contrary to a rotation direction of the agitator to allow the mixed materials in the mixing barrel to form a turbulence therein, thereby achieving an effect of agitating sufficiently and uniformly.

4. A forming method according to claim 2, wherein in the step of the preparation of inner ball and forming of composite pellet, the pelletiser is a disc type pelletiser; feeding all the inner balls which is not meeting the process granularity requirement screened out in step (3) into a roller mill or damp mill for milling, and selectively adding the inner ball material according to a requirement for material humidity during milling, and then returning into the intensive mixer or damp mill in step (1) to form closed-loop circulation.

5. A forming method according to claim 1, wherein the step (2) of the forming method comprises the following steps: adding the carbonaceous reductant powder and silica powder to an intensive mixer or a damp mill, meanwhile adding a binding agent, mixing sufficiently and uniformly to obtain the cladding material and feeding the cladding material into a cladding material silo.

6. A forming method according to claim 5, wherein the intensive mixer in step of preparing cladding material includes an obliquely rotatable mixing barrel, a rotatable agitator is mounted in the mixing barrel; upon mixing, a rotation direction of the mixing barrel is contrary to a rotation direction of the agitator to allow the mixed materials in the mixing barrel to form a turbulence therein, thereby achieving an effect of agitating sufficiently and uniformly.

7. A forming method according to claim 1, wherein the step (3) of the forming method comprises the following steps: the inner ball obtained in step (1) is subjected to bi-layered roller-type screening treatment to obtain inner ball with a granularity meeting the process requirement, feeding the inner ball into another pelletiser for cladding treatment, meanwhile, introducing the cladding material into the pelletiser, additionally adding the binding agent in an application form of droplets and/or mist during the cladding treatment, the addition amount of the binding agent is 1%-12% of the mass of the cladding material, the composite green pellet is obtained upon completion of the cladding treatment.

8. A forming method according to claim 1, wherein a method of preparing the binding agent used in the present embodiment specifically comprises the following steps:
(1) Preparing Raw Material: selecting coal containing humic acid and caustic soda as raw material, mixing caustic soda with water to obtain sodium hydroxide solution;
(2) Ball-Grinding and Mixing: ball-grinding and mixing the coal and sodium hydroxide solution in step (1) with a 1:3-10 solid-to-liquid ratio;
(3) Synthesizing: feeding the mixed material in step (2) into a reaction tank with an agitator, starting the agitator, heating to 40-95° C. to perform synthesis reaction;
(4) Filtering: filtering the reaction product in step (3) to obtain filtrate as the binding agent.

9. A forming method according to claim 8, wherein the time of the ball-grinding in step (2) of the preparing the binding agent is 5 min-120 min.

10. A forming method according to claim 8, wherein the time of reaction in step (3) of the preparing the binding agent is not less than 30 min.

11. A forming method according to claim 8, wherein in step (1) of the preparing the binding agent, the coal material refers to weathered coal, peat and/or lignite containing humic acid above 20%.

12. A forming method according to claim 8, wherein in step (1) of the preparing the binding agent, a mass percentage concentration of the sodium hydroxide solution is controlled in a range of 1%40%.

13. A forming method according to claim 1, wherein low-temperature hot air a range of 100-200° C. introduced into the low-temperature drying stage performs up-down air pumping or down-up wind blowing so that the low-temperature hot air vertically passes through a material layer and performs through-drying for the composite green pellets; the low-temperature hot air originates from exhaust gas discharged at a high-temperature hot air outlet of the high-temperature drying stage;

intermediate-temperature hot air a range of 150-250° C. introduced into the intermediate-temperature drying stage performs up-down air pumping or down-up wind blowing so that the intermediate-temperature hot air vertically passes through the material layer and performs through-drying for the composite green pellets;

high-temperature hot air a range of 200-350° C. introduced into the high-temperature drying stage performs up-down air pumping or down-up wind blowing so that the high-temperature hot air vertically passes through the material layer and performs through-drying for the composite green pellets.

\* \* \* \* \*